United States Patent
Onuma et al.

(10) Patent No.: US 6,812,284 B2
(45) Date of Patent: Nov. 2, 2004

(54) IMPACT MODIFIER AND AMORPHOUS POLYESTER RESIN COMPOSITIONS CONTAINING THE SAME

(75) Inventors: Hisashi Onuma, Hyogo (JP); Hideki Kawai, Hyogo (JP); Mamoru Kadokura, Hyogo (JP)

(73) Assignee: Kaneka Corporation, Osaka (JP)

(*) Notice: Subject to any disclaimer, the term of this patent is extended or adjusted under 35 U.S.C. 154(b) by 118 days.

(21) Appl. No.: 10/239,095
(22) PCT Filed: Jan. 15, 2002
(86) PCT No.: PCT/JP02/00195
   § 371 (c)(1),
   (2), (4) Date: Dec. 27, 2002
(87) PCT Pub. No.: WO02/055571
   PCT Pub. Date: Jul. 18, 2002

(65) Prior Publication Data
US 2004/0039082 A1 Feb. 26, 2004

(30) Foreign Application Priority Data
Jan. 16, 2001 (JP) .................. P2001-007174

(51) Int. Cl.⁷ ............... C08L 47/00; C08L 51/04; C08L 67/00
(52) U.S. Cl. ............ 525/71; 525/98; 525/303; 525/308; 525/902; 523/201; 524/504
(58) Field of Search ............ 525/71, 98, 303, 525/308, 902; 523/201; 524/504

(56) References Cited

U.S. PATENT DOCUMENTS

| | | |
|---|---|---|
| 4,417,026 A | 11/1983 | Lindner et al. |
| 5,321,056 A | 6/1994 | Carson et al. |
| 5,409,967 A * | 4/1995 | Carson et al. .............. 523/201 |
| 5,446,084 A | 8/1995 | Huemke et al. |
| 5,576,394 A | 11/1996 | Chao et al. |

FOREIGN PATENT DOCUMENTS

| | | |
|---|---|---|
| EP | 0 527 605 A1 | 2/1993 |
| EP | 0 557 944 A1 | 9/1993 |
| EP | 0 722 961 A1 | 7/1996 |
| EP | 0 953 583 A2 | 11/1999 |
| EP | 0 985 692 A2 | 3/2000 |
| EP | 1 095 982 A1 | 5/2001 |
| JP | 54-048850 | 4/1979 |
| JP | 07-188587 | 7/1995 |

OTHER PUBLICATIONS

Australian Patent Office Search Report Corresponding to Application No. SG 200205552–3, dated Aug. 11, 2003, 4 pages.
International Search Report Corresponding to International Application No. PCT/JP02/00195 From Japanese Patent Office Dated Mar. 26, 2002.

* cited by examiner

Primary Examiner—James J. Seidleck
Assistant Examiner—Olga Asinovsky
(74) Attorney, Agent, or Firm—Brinks Hofer Gilson Lione

(57) ABSTRACT

Obtention of the amorphous polyester resin compositions having improved impact resistance, by using the core-shell impact resistance improving agents which comprises: (A) from 40 to 90 parts by weight of a core made of a butadiene-based copolymer; (B) from 5 to 40 parts by weight of an inner layer shell obtained by polymerizing a monomer mixture containing a (meth) acrylate monomer having hydroxyl or alkoxy group; and (C) from 5 to 20 parts by weight of an outer layer shell obtained by polymerizing a monomer mixture containing an aromatic vinyl monomer.

2 Claims, No Drawings

IMPACT MODIFIER AND AMORPHOUS POLYESTER RESIN COMPOSITIONS CONTAINING THE SAME

RELATED APPLICATIONS

This application is a nationalization of PCT application PCT/JP02/00195 filed Jan. 15, 2002. This application claims priority from the PCT application and Japan Application Serial No. 2001-7174 filed Jan. 16, 2001.

FIELD OF THE INVENTION

This invention relates to amorphous polyester resin compositions. More particularly, it relates to novel amorphous polyester resin compositions which contain core-shell impact resistance improving agents and have excellent transparency and impact resistance.

BACKGROUND ART

Because being excellent in transparency, mechanical properties and gas barrier properties, amorphous polyester resin compositions have been widely employed mainly in packaging materials such as bottles and sheets. With the recent tendency toward large-sized containers in complicated shapes, it has been required to elevate the impact resistance of these compositions. To improve the impact resistance of polyester resin compositions, attempts have been made to add fibrous inorganic fillers, thereby achieving certain effects of improving the impact resistance. Also, attempts have been frequently made to add rubbery polymers and rubber-containing polymers to polyester resin compositions to improve the impact resistance. In particular, it is known that core-shell impact resistance improving agents having rubbery polymer particles enclosed in a glassy polymer are effective in improving impact resistance. In case of adding these fibrous inorganic fillers or core-shell impact resistance improving agents to amorphous polyester resin compositions, the impact resistance can be effectively improved. In such a case, however, the transparency of the amorphous polyester resin compositions is seriously damaged. Namely, excellent impact resistance and high transparency can be hardly achieved at the same time.

In case of adding these fibrous inorganic fillers or core-shell impact resistance improving agents to amorphous polyester resin compositions, the impact resistance can be effectively improved. In such a case, however, the transparency of the amorphous polyester resin compositions is seriously damaged. Namely, excellent impact resistance and high transparency can be hardly achieved at the same time and thus no satisfactory result can be established so far.

Japanese Patent No. 2,079,959 discloses core-shell polymers which have a core carrying epoxy group on its surface and a shell free from epoxy group or any functional group reactive with the epoxy group located on the core as improving agents for crystalline polyalkylene terephthalates such as poly (butylene terephthalate). However, this document neither discloses nor suggests any effective method of maintaining a high transparency in amorphous polyester resin compositions.

U.S. Pat. No. 5,321,056 discloses blends of impact resistance improving agents capable of imparting a high transparency and a high notched Izod impact resistance with amorphous aromatic polyesters. The impact resistance improving agents disclosed therein are core-shell polymers having a core mainly containing rubbery polymers of diolefin and aromatic vinyl monomers and a shell mainly containing aromatic vinyl monomers and monomers having hydroxyl group. Although the impact resistance can be surely improved by introducing the monomers having hydroxyl group into the core, the improving effect is not so high and the optical transparency is still insufficient. In such a case, moreover, a high viscosity is observed at the melt-blending step, which brings about a problem in molding properties.

As impact resistance improving agents for amorphous aromatic polyesters, Japanese Patent Laid-Open No. 34327/2000 discloses core-shell polymers having a core mainly containing rubbery polymers of diolefin and aromatic vinyl monomers, an intermediate stage mainly containing aromatic vinyl monomers, and a shell mainly containing hydroxyalkyl (meth)acrylate monomers and aromatic vinyl monomers. Although the impact resistance can be improved by introducing monomers having hydroxyl group into the outer layer of the shell, the improving effect is not so high and the optical transparency is still insufficient. Although these improving agents disclosed in Japanese Patent Laid-Open No. 34327/2000 impart a significantly improved impact resistance to transparent and amorphous aromatic polyesters, improving agents capable of imparting well-balanced impact resistance and optical transparency are still needed.

DISCLOSURE OF THE INVENTION

The invention aims at providing amorphous polyester resin compositions which are excellent in both of transparency and impact resistance.

To solve these problems, the present inventors have conducted intensive studies. As a result, they have found out core-shell impact resistance improving agents having a core made of a butadiene-based copolymer and an inner layer shell containing hydroxy or alkoxy group.

Accordingly, the invention relates to:

1. a core-shell impact resistance improving agent which comprises: (A) from 40 to 90 parts by weight of a core made of a butadiene-based copolymer obtained by polymerizing a monomer mixture containing from 30 to 100% by weight of a butadiene monomer, from 0 to 70% by weight of an aromatic vinyl monomer, from 0 to 10% by weight of a copolymerizable vinyl monomer and from 0 to 5% by weight of a crosslinkable monomer; (B) from 5 to 40 parts by weight of an inner layer shell obtained by polymerizing a monomer mixture containing from 60 to 98% by weight of an aromatic vinyl monomer, from 2 to 40% by weight of a (meth) acrylate monomer having hydroxyl or alkoxy group and from 0 to 20% by weight of a copolymerizable vinyl monomer; and (C) 5 to 20 parts by weight of an outer layer shell obtained by polymerizing a monomer mixture containing from 10 to 100% by weight of an aromatic vinyl monomer, from 0 to 90% by weight of an alkyl (meth)acrylate having 1 to 8 carbon atoms in the alkyl group, and from 0 to 50% by weight of a copolymerizable vinyl monomer, thus giving the sum of (A), (B) and (C) of 100 parts by weight; and 2. an amorphous polyester resin composition which comprises from 1 to 40% by weight of the impact resistance improving agent as described above and from 60 to 99% by weight of an amorphous polyester resin.

BEST MODE FOR CARRYING OUT THE INVENTION

The core (A) of the core-shell impact resistance improving agent according to the invention is obtained. by polymerizing a monomer mixture containing from 30 to 100% by weight, preferably from 40 to 90% by weight and still preferably from 50 to 80% by weight, of a butadiene monomer, from 0 to 70% by weight, preferably from 10 to 60% by weight and still preferably from 20 to 50% by weight, of an aromatic vinyl monomer, from 0 to 10% by weight of a vinyl monomer copolymerizable with these monomers, and from 0 to 5% by weight of a crosslinkable monomer. From the viewpoint of strength, it is preferable to use a butadiene monomer. However, it is desirable to use not more than 90% by weight of the butadiene monomer from the viewpoint of transparency, since its reflective index largely differs from the reflective index of amorphous polyester resin compositions. It is also desirable that the content of the butadiene monomer is not less than 40% by weight, since the effect of expressing strength is superior. Therefore, it is preferable to use from 40 to 90% by weight, still preferably from 50 to 80% by weight, of the butadiene monomer. The aromatic vinyl monomer means a compound having a vinyl double bond and one or more benzene nuclei in a single molecule. Particular examples thereof include aromatic vinyl monomers such as styrene, α-methylstyrene, 2-methylstyrene, 3-methylstyrene, 4-methylstyrene, 4-ethylstyrene, 2,5-dimethylstyrene, 4-methoxystyrene, 4-ethoxystyrene, 4- propoxystyrene, 4-butoxystyrene, chlorostyrene, dichlorostyrene, trichlorostyrene, vinyltoluene, bromostyrene, dibromostyrene, tribromostyrene, vinylnaphthalene, isopropenylnaphthalene, isopropenylbiphenyl and divinylbenzene, though the invention is not restricted thereto. Since the reflective index of rubber particles can be elevated and thus brought so close to the reflective index of amorphous polyester resin composition by using such an aromatic vinyl monomer, it is preferable from the viewpoint of transparency to use 10% by weight or more, still preferably 20% by weight or more, of the aromatic vinyl monomer. It is preferable to use 60% by weight or less, still preferably 50% by weight or less, of the aromatic vinyl monomer, in order to keep the strength. Examples of the copolymerizable vinyl monomer include (meth)acrylates of alcohols having 1 to 8 carbon atoms such as methyl (meth)acrylate, ethyl (meth)acrylate and butyl (meth)acrylate, (meth)acrylonitrile, (meth)acrylic acid, phenyl (meth)acrylate, vinyl cyanide compounds such as vinylidene cyanate, and 1,2-dicyanoethylene and maleimide compounds, though the invention is not restricted thereto. Examples of the crosslinkable monomer include divinylbenzene monoethylene glycol dimethacrylate and ethylene glycol dimethacrylate, though the invention is not restricted thereto. It is preferable to use the crosslinkable monomer in an amount of from 0 to 5% by weight, since use thereof in an amount exceeding 5% by weight results in a decrease in the impact strength.

Unless otherwise indicated, the term "% by weight" hereinafter means "% by weight" based on the total amount of each constituent part A, B or C, or total weight of amorphous polyester resin composition. The expression "X is contained in an amount of from 0 to Y %" means that X is either not present, or is higher than 0% and Y % or lower.

The inner layer shell (B) of the core-shell impact resistance improving agent according to the invention is obtained by polymerizing a monomer mixture containing from 60 to 98% by weight of an aromatic vinyl monomer, from 2 to 40% by weight of a monomer containing a (meth)acrylate having hydroxyl or alkoxy group and from 0 to 20% by weight of a vinyl monomer copolymerizable with these monomers. To prepare the inner layer shell by the polymerization, the monomer mixture may be fed by an arbitrary method without restriction. For example, use may be made therefor of the continuous one-step addition method or the two-step addition method. The aromatic vinyl monomer constituting the inner layer shell is a compound having one vinyl double bond and one or more benzene nuclei in a single molecule. Particular examples thereof include aromatic vinyl monomers such as styrene, α-methylstyrene, 2-methylstyrene, 3-methylstyrene, 4-methylstyrene, 4-ethylstyrene, 2,5-dimethylstyrene, 4-methoxystyrene, 4-ethoxystyrene, 4-propoxystyrene, 4-butoxystyrene, chlorostyrene, dichlorostyrene, trichlorostyrene, vinyltoluene, bromostyrene, dibromostyrene, tribromostyrene, vinylnaphthalene, isopropenylnaphthalene and isopropenylbiphenyl, though the invention is not restricted thereto. It is preferable from the viewpoint of transparency to use such an aromatic vinyl monomer, since the reflective index of the shell can be elevated and thus brought so close to the reflective index of amorphous polyester resin composition thereby. Examples of the monomer containing a (meth) acrylate having hydroxyl or alkoxy group include hydroxy acrylate such as hydroxyethyl acrylate and hydroxypropyl acrylate, hydroxy methacrylates such as hydroxyethyl methacrylate and hydroxypropyl methacrylate, alkoxy acrylates such as methoxyethyl acrylate and ethoxyethyl acrylate and alkoxy methacrylate such as methoxyethyl methacrylate and ethoxyethyl methacrylate, though the invention is not restricted thereto. It is preferable to use such a monomer in the inner layer shell for improving the interfacial adhesion properties between an amorphous polyester resin and the core-shell improving agent. It is also preferable for regulating an increase in the viscosity in the step of melt-blending. Examples of the copolymerizable vinyl monomer include (meth)acrylates of alcohols having 1 to 8 carbon atoms such as methyl (meth)acrylate, ethyl (meth)acrylate and butyl (meth)acrylate, (meth)acrylonitrile, (meth) acrylic acid, phenyl (meth)acrylate, vinyl cyanide compounds such as vinylidene cyanate and 1,2-dicyanoethylene and maleimide compounds, though the invention is not restricted thereto.

The outer layer shell (C) to be used in the core-shell impact resistance improving agent according to the invention is obtained by polymerizing a monomer mixture containing from 10 to 100% by weight of an aromatic vinyl monomer, from 0 to 90% by weight of an alkyl (meth) acrylate and from 0 to 50% by weight of a copolymerizable vinyl monomer. To prepare the outer layer shell by the polymerization, the monomer mixture may be fed by an arbitrary method without restriction. For example, use may be made therefor of the continuous one-step addition method or the two-step addition method. The alkyl (meth) acrylate constituting the outer layer shell is an acrylic acid ester or a methacrylic acid ester such as methyl methacrylate, ethyl methacrylate, butyl methacrylate, methyl acrylate, ethyl acrylate or butyl acrylate, though the invention is not restricted thereto. It is preferable from the viewpoint of improving the dispersibility in an amorphous polyester resin composition to use such a (meth)acrylate. Examples of the aromatic vinyl monomer include styrene, α-methylstyrene, 2-methylstyrene, 3-methylstyrene, 4-methylstyrene, 4-ethylstyrene, 2,5-dimethylstyrene, 4-methoxystyrene, 4-ethoxystyrene, 4-propoxystyrene, 4-butoxystyrene, chlorostyrene, dichlorostyrene, trichlorostyrene, vinyltoluene, bromostyrene, dibromostyrene, tribromostyrene, vinylnaphthalene, isopropenylnaphthalene and isopropenylbiphenyl, though the invention is not restricted thereto. It is preferable from the viewpoint of transparency to use such an aromatic vinyl monomer, since the reflective index of the shell can be brought so close to the reflective index of an amorphous polyester resin composition thereby. Examples of the copolymerizable vinyl monomer include acrylic acid, methacrylic acid, methacrylonitrile, acrylonitrile, vinyl cyanide compounds such as vinylidene cyanate and 1,2-dicyanoethylene and maleimide compounds, though the invention is not restricted thereto. The core-shell impact resistance improving agent according to the invention has an inner layer shell and an outer layer shell. The inner layer shell is provided in order to bring the reflective index of the core-shell impact resistance improving agent close to the reflective index of an amorphous polyester resin composition and improve the interfacial adhesion properties between an amorphous polyester resin and the core-shell impact resistance improving agent. The outer layer shell is provided in order to improve the dispersibility of the core-shell impact resistance improving agent in an amorphous polyester resin composition.

The core-shell impact resistance improving agent according to the invention contains from 40 to 90 parts by weight of the core (A), from 5 to 40 parts by weight of the inner layer shell (B) and from 5 to 20 parts by weight of the outer layer shell (C). In case where the contents of these components are excluded respectively from these ranges, the balance of the transparency and the impact resistance as a resin improving agent is worsened. Further, it contains from 50 to 80 parts by weight of the core (A), from 10 to 30 parts by weight of the inner layer shell (B) and from 8 to 15 parts by weight of the outer layer shell (C) (i.e., the sum being 100 parts by weight). In case where the contents of these components are excluded respectively from these ranges, the balance of the transparency and the impact resistance as a resin improving agent is liable to be somewhat worsened.

Although the particle size of the core-shell impact resistance improving agent is not particularly restricted, it preferably ranges from 0.05 to 0.5 $\mu$m, since when the particle size is not less than 0.05 $\mu$m, the impact strength can be largely improved, and when it not exceeds 0.5 $\mu$m, the transparency is maintained. To control the particle size of the butadiene-based copolymer to the desired level, use can be made of the method of enlarging polymer particles via aggregation during graft polymerization with the use of a water-soluble electrolyte as disclosed by Japanese Patent Publication No. 12158/1968 or the method of using an acid group-containing latex made of a copolymer of (meth) acrylate with an unsaturated acid as disclosed by Japanese Patent Laid-Open No. 012704/1996.

Examples of the amorphous polyester resin to be improved by the invention include polyethylene terephthalate (PET), polypentylene terephthalate and copolyesters having 2 glycol-origin units (for example, ethylene glycol and cyclehexane dimethanol) or 2 basic acid-origin units (for example, terephthalic acid and isophthalic acid), for example, PETG manufactured by Eastman Kodak (e.g., (poly)ethylene-co-1,4-cyclohexane dimethylene terephthalate). Such a polyester can be obtained by polycondensing a polyol component (for example, ethylene glycol) with a dicarboxylic acid component (for example, terephthalic acid, isophthalic acid, naphthalenedicarboxylic acid). Mixtures of 2 or more polyesters are also involved in this scope.

The core-shell impact resistance improving agent according to the invention can be obtained by, for example, emulsion polymerization, suspension polymerization or solution polymerization. Among all, emulsion polymerization is favorable. Namely, the core-shell impact resistance improving agent according to the invention can be produced by a publicly known method of emulsion polymerization performed in a known order.

The blending ratio of the core-shell impact resistance improving agent (1) to the amorphous polyester or copolyester (2) varies depending on the purpose. It is appropriate to use from 1 to 40% by weight of the core-shell impact resistance improving agent (1) and from 60 to 99% by weight of the amorphous polyester or copolyester (2). The composition according to the invention can be prepared from the core-shell impact resistance improving agent (1) and the amorphous polyester or copolyester (2) by employing a publicly known method without restriction.

As a matter of course, the compositions according to the invention may adequately contain additional components usually employed in amorphous polyester resin compositions, for example, fibrous inorganic fillers and pigments, in addition to the amorphous polyester resin and the core-shell impact resistance improving agent.

To produce the resin compositions according to the invention, use can be made of a process which involves preliminarily producing an amorphous polyester resin and a core-shell impact resistance improving agent separately, mixing them by a conventional blending method with the use of, for example, a Henschel mixer or a tumbler, and then shaping by using an apparatus commonly employed in shaping such as a single-screw extruder, a twin-screw extruder, a Banbury mixer or a heat roll. The resin compositions according to the invention may further contain commonly employed additives such as antioxidants, heat stabilizers, light-resistance improving agents, UV absorbers, lubricating agents, plasticizers, releasing agents, antistatic agents, sliding property improving agents and coloring agents.

EXAMPLES

To further illustrate the compositions according to the invention, and not by way of limitation, the following Examples will be given. In these Examples, various physical properties were evaluated by the following methods. Unless otherwise noted, all parts and % are by weight.

To 100 parts of an amorphous copolyester resin (EASTER 6763 manufactured by Eastman Kodak), 5 parts of a core-shell impact resistance improving agent and 1 part of a lubricating agent were added and pre-mixed. Then the mixture was melt-kneaded by using an 8 inch heat roll (manufactured by Kansai Roll K. K.) to give a sheet. The obtained sheet was molded by pressing to give a sample piece for a transparency test and another sample piece for an Izod impact strength test. The Izod impact strength was measured in accordance with JIS K-7110 at room temperature (23° C.). The sample piece was molded into a notched article (3 mm). The transparency was measured in accordance with ASTM D-1003. The sample piece was molded into an article (3 mm).

Example 1

200 parts of purified water, 1.5 parts of sodium oleate, 0.002 parts of ferrous sulfate, 0.005 parts of disodium ethylenediaminetetraacetate, 0.2 parts of sodium formaldehydesulfoxylate, 0.2 parts of tripotassium phosphate, 76 parts of butadiene, 24 parts of styrene, 1.0 part of divinylbenzene and 0.1 part of diisopropylbenzene hydroperoxide were fed into a polymerization container provided with a stirrer and polymerized at 50° C. for 15 hours to give a rubber latex (a) showing a polymer conversion ratio of 99% and having an average particle size of 0.07 $\mu$m. 180 parts (solid content: 60 parts) of this rubber latex (a) was mixed with 200 parts of purified water, 0.002 parts of ferrous sulfate, 0.004 parts of disodium ethylenediaminetetraacetate and 0.1 parts of sodium formaldehydesulfoxylate. Then a liquid mixture of 30 parts of styrene; 3 parts of hydroxyethyl methacrylate and 0.2 parts of cumene hydroperoxide was continuously added thereto at 60° C. and polymerized for 1 hour to give an inner layer shell. The polymer conversion ratio was 99%. After the completion of the polymerization of the inner layer shell, a liquid mixture of 5 parts of styrene, 2 parts of methyl methacrylate and 0.2 parts of cumene hydroperoxide was continuously added thereto at 60° C. and polymerized for 1 hour to give an outer layer shell. Thus, a core-shell impact resistance improving agent latex was prepared. The polymer conversion ratio of the outer layer shell was 98%. The core-shell impact resistance improving agent latex thus obtained was solidified by using hydrochloric acid, heated, washed, dehydrated and dried to thereby give a powdery core-shell impact resistance improving agent.

Example 2

180 parts (solid content: 60 parts) of the rubber latex (a) prepared by the same method as in Example 1 was mixed with 200 parts of purified water, 0.002 parts of ferrous sulfate, 0.004 parts of disodium ethylenediaminetetraacetate and 0.1 parts of sodium formaldehydesulfoxylate. Then a liquid mixture of 30 parts of styrene, 3 parts of hydroxyethyl methacrylate and 0.2 parts of cumene hydroperoxide was continuously added thereto at 60° C. and polymerized for 1 hour to give an inner layer shell. The polymer conversion ratio was 99%. After the completion of the polymerization of the inner layer shell, a liquid mixture of 5 parts of styrene, 2 parts of acrylonitrile and 0.2 parts of cumene hydroperoxide was continuously added thereto at 60° C. and polymerized for 1 hour to give an outer layer shell. Thus, a core-shell impact resistance improving agent latex was prepared. The polymer conversion ratio of the outer layer shell was 98%. The core-shell impact resistance improving agent latex thus obtained was solidified by using hydrochloric acid, heated, washed, dehydrated and dried to thereby give a powdery core-shell impact resistance improving agent.

Comparative Example 1

180 parts (solid content: 60 parts) of the rubber latex (a) prepared by the same method as in Example 1 was mixed with 200 parts of purified water, 0.002 parts of ferrous sulfate, 0.004 parts of disodium ethylenediaminetetraacetate and 0.1 parts of sodium formaldehydesulfoxylate. Then a liquid mixture of 30 parts of styrene and 0.2 parts of cumene hydroperoxide was continuously added thereto at 60° C. and polymerized for 1 hour to give an inner layer shell. After the completion of the polymerization of the inner layer shell, a liquid mixture of 5 parts of styrene, 5 parts of methyl methacrylate and 0.2 parts of cumene hydroperoxide was continuously added thereto at 60° C. and polymerized for 1 hour to give an outer layer shell. Thus, a core-shell impact resistance improving agent latex was prepared. The core-shell impact resistance improving agent latex thus obtained was solidified by using hydrochloric acid, heated, washed, dehydrated and dried to thereby give a powdery core-shell impact resistance improving agent.

Comparative Example 2

180 parts (solid content: 60 parts) of the rubber latex (a) prepared by the same method as in Example 1 was mixed with 200 parts of purified water, 0.002 parts of ferrous sulfate, 0.004 parts of disodium ethylenediaminetetraacetate and 0.1 parts of sodium formaldehydesulfoxylate. Then a liquid mixture of 30 parts of styrene and 0.2 parts of cumene hydroperoxide was continuously added thereto at 60° C. and polymerized for 1 hour to give an inner layer shell. After the completion of the polymerization of the inner layer shell, a liquid mixture of 5 parts of styrene, 2 parts of methyl methacrylate, 3 parts of hydroxyethyl methacrylate and 0.2 parts of cumene hydroperoxide was continuously added thereto at 60° C. and polymerized for 1 hour to give an outer layer shell. Thus, a core-shell impact resistance improving agent latex was prepared. The core-shell impact resistance improving agent latex thus obtained was solidified by using hydrochloric acid, heated, washed, dehydrated and dried to thereby give a powdery core-shell impact resistance improving agent.

Table 1 shows the results of the evaluation of these samples.

TABLE 1

| | Improving agent (parts) | Izod impact strength (J/m) | Light Transmission (%) | Haze (%) |
|---|---|---|---|---|
| Ex. 1 | 5 | 850 | 72 | 10 |
| Ex. 2 | 5 | 950 | 75 | 8 |
| C.Ex. 1 | 5 | 800 | 65 | 18 |
| C.Ex. 2 | 5 | 900 | 65 | 17 |

Industrial Applicability

According to the invention, amorphous polyester resin compositions having improved impact resistance can be obtained without seriously damaging the optical properties of amorphous polyester resins, which is highly useful industrially.

What is claimed is:

1. A core-shell impact resistance improving agent which comprises: (A) from 40 to 90 parts by weight of a core made of a butadiene-based copolymer obtained by polymerizing a monomer mixture containing from 30 to 100% by weight of a butadiene monomer, from 0 to 70% by weight of an aromatic vinyl monomer, from 0 to 10% by weight of a copolymerizable vinyl monomer and from 0 to 5% by weight of a crosslinkable monomer; (B) from 5 to 40 parts by weight of an inner layer shell obtained by polymerizing a monomer mixture containing from 60 to 98% by weight of an aromatic vinyl monomer, from 2 to 40% by weight of a (meth)acrylate monomer having hydroxyl or alkoxy group and from 0 to 20% by weight of a copolymerizable vinyl monomer; and (C) from 5 to 20 parts by weight of an outer layer shell obtained by polymerizing a monomer mixture containing from 10 to 100% by weight of an aromatic vinyl monomer, from 0 to 90% by weight of an alkyl (meth) acrylate having 1 to 8 carbon atoms in the alkyl group, and from 0 to 50% by weight of a copolymerizable vinyl monomer, thus giving the sum of (A), (B) and (C) of 100 parts by weight.

2. An amorphous polyester resin composition which comprises from 1 to 40% by weight, based on total weight of amorphous polyester resin composition, of the impact resistance improving agent as claimed in claim 1 and from 60 to 99% by weight, based on total weight of amorphous polyester resin composition, of an amorphous polyester resin.

* * * * *